United States Patent
Al-Qasim et al.

(10) Patent No.: US 12,297,727 B2
(45) Date of Patent: May 13, 2025

(54) ENHANCED CO2 FRACKING OPERATION

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/343,887

(22) Filed: Jun. 29, 2023

(65) Prior Publication Data

US 2025/0003320 A1    Jan. 2, 2025

(51) Int. Cl.
*E21B 43/26*      (2006.01)
*E21B 43/24*      (2006.01)

(52) U.S. Cl.
CPC ...... *E21B 43/2605* (2020.05); *E21B 43/2405* (2013.01)

(58) Field of Classification Search
CPC .... E21B 43/24; E21B 43/2405; E21B 43/243; E21B 43/247; E21B 43/25; E21B 43/255; E21B 43/26; E21B 43/2605
See application file for complete search history.

(56) References Cited

U.S. PATENT DOCUMENTS

| | | | |
|---|---|---|---|
| 5,069,283 A | 12/1991 | Mack | |
| 6,227,293 B1 * | 5/2001 | Huffman | E21B 43/003 166/177.2 |
| 6,439,310 B1 | 8/2002 | Scott, III et al. | |
| 7,980,312 B1 * | 7/2011 | Hill | E21B 43/241 166/272.2 |
| 11,131,172 B2 | 9/2021 | Lin et al. | |
| 11,371,328 B1 | 6/2022 | Zhou et al. | |
| 2002/0053284 A1 * | 5/2002 | Koros | B01D 69/08 96/10 |

(Continued)

FOREIGN PATENT DOCUMENTS

| | | |
|---|---|---|
| CA | 2945899 A1 | 5/2017 |
| CN | 106030028 A | 10/2016 |
| CN | 107448179 B | 3/2020 |
| CN | 112304842 B | 7/2021 |
| CN | 113431547 B | 7/2022 |
| CN | 114876438 A | 8/2022 |

(Continued)

OTHER PUBLICATIONS

L. M. Surguchev, "Air Injection to Improve Oil Recovery from Mature Light Oil Field", International Research Institute of Stavange, Oct. 5, 2022 (29 pages).

(Continued)

*Primary Examiner* — Angela M DiTrani Leff
(74) *Attorney, Agent, or Firm* — Osha Bergman Watanabe & Burton LLP

(57) ABSTRACT

A method for stimulating hydrogen production from an injection formation. This method includes the steps of providing a well traversing a subsurface into an injection formation containing hydrocarbons. Carbon dioxide, water, steam, and combustion gas are introduced into the injection formation via the well. Further, the injection formation is stimulated using one or more of infrasonic, sonic, and ultrasonic stimulation. The injection formation is monitored via one or more sensors located in the injection formation to determine one or more properties of reactions in the injection formation and the flow back effluent. Flowback operations are conducted to retrieve flowback effluent.

14 Claims, 5 Drawing Sheets

(56) References Cited

U.S. PATENT DOCUMENTS

| | | | |
|---|---|---|---|
| 2011/0220351 A1* | 9/2011 | Surguchev | E21B 43/24 |
| | | | 166/260 |
| 2012/0067568 A1* | 3/2012 | Palmer | E21B 43/40 |
| | | | 166/402 |
| 2020/0182019 A1 | 6/2020 | Wang et al. | |
| 2021/0189856 A1* | 6/2021 | Gates | E21B 43/243 |

FOREIGN PATENT DOCUMENTS

| | | | | |
|---|---|---|---|---|
| GB | 2485951 A | * | 5/2012 | C09K 8/845 |
| WO | 2022/146886 A1 | | 7/2022 | |
| WO | 2023/007467 A2 | | 2/2023 | |

OTHER PUBLICATIONS

Hydraulic Fracturing 101. Earthworks. Oct. 5, 2022 (16 pages).

X. Song et al., "Fracturing with Carbon Dioxide: From Microscopic Mechanism to Reservoir Application", Joule, Aug. 21, 2019, vol. 3, Issue 8, pp. 1913-1926 (15 pages).

B. Dogah et al., "Enhanced Oil Recovery Using CO2 in Alaska", Geosciences, 2021, vol. 11, No. 98, pp. 1-26 (26 pages).

N. Mohammed et al., "Alternating N2 gas injection as a potential technique for enhanced gas recovery and CO2 storage in consolidated rocks: an experimental study", Journal of Petroleum Exploration and Production Technology, Jun. 20, 2020 (21 pages).

N. J. Huerta et al., "Hydraulic fracturing to enhance injectivity and storage capacity of CO2 storage reservoirs: Benefits and risks", International Journal of Greenhouse Gas Control, Sep. 2020, vol. 100, 103105 (44 pages).

International Search Report and Written Opinion of the International Searching Authority issued in corresponding International Application No. PCT/US2024/035588, mailed Oct. 14, 2024 (17 pages).

Osselin, Forian et al., "Orange hydrogen is the new green"; Nature Geoscience; vol. 15, Issue 10; pp. 765-769; Oct. 3, 2022 (22 pages).

Neelameggham, Neale R. et al., "Thermoeconomic Dynamics of Energy-Efficient Orange Hydrogen Production: An Energy Matter"; Energy Efficiency and Low Carbon Footprint in Metals Processing; vol. 74, Issue 5; pp. 1923-1931; Published Online Feb. 11, 2022 (9 pages).

\* cited by examiner

ENHANCED CO2 FRACKING OPERATION

BACKGROUND

Conventional well stimulation and fracturing (fracking) techniques in hydrocarbons reservoirs use large amounts of water ($H_2O$) and energy. Carbon dioxide fracking or carbon dioxide assisted stimulation techniques are often used as an alternate to the conventional techniques.

In fracking, carbon dioxide ($CO_2$) may be injected into a formation under pressure. Fracking with $CO_2$ is useful because of improved productivity and the availability of $CO_2$ for reuse. However, a disadvantage of $CO_2$ fracking is that injected $CO_2$ gas, buoyant liquid, or supercritical fluid usually flows back during post-fracking cleanup operations. The injected $CO_2$ may pool in an upper portion of the formation and surface capture of the pooled $CO_2$ may be expensive, especially in remote areas. Further, an added cost is required to monitor the formation for leaks of the pooled $CO_2$. Thus, the $CO_2$ that flows back is often vented into the environment. $CO_2$ is a greenhouse gas, and the vented $CO_2$ gas may lead to an increase in global climate change. Effort to eliminate or reduce $CO_2$ emissions include enhanced $CO_2$ fracking operations.

As an alternative, enhanced $CO_2$ fracking operations that increase the production of hydrogen while lowering the production of $CO_2$ may be beneficial in reducing the global greenhouse effect. Hydrogen production may also promote sustainable development because $H_2$ is useful for power generation and is applied to energy-intensive industries. Accordingly, there exists a need for a method that reduces the pooled $CO_2$ and $CO_2$ emissions into the environment and for a method that increases $H_2$ production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for stimulating hydrogen production from an injection formation. This method includes the steps of providing a well traversing a subsurface into an injection formation containing hydrocarbons and introducing carbon dioxide, water and combustion gas into the injection formation via the well. The injection formation is stimulated using one or more of infrasonic, sonic, and ultrasonic stimulation. The injection formation is monitored via one or more sensors located in the injection formation to determine one or more properties of reactions in the injection formation and the flowback effluent. Further, flowback operations are conducted to retrieve flowback effluent.

In another aspect, embodiments disclosed herein relate to a method for stimulating hydrogen production from an injection formation. This method includes the steps of providing a well traversing a subsurface into an injection formation containing hydrocarbons. Carbon dioxide and combustion gas are introduced into the injection formation via the well. Water and steam are also introduced into the injection formation via the well. Further, the injection formation is stimulated using one or more of infrasonic, sonic, and ultrasonic stimulation. The injection formation is monitored via one or more sensors located in the injection formation to determine one or more properties of reactions in the injection formation and the flowback effluent. Further, flowback operations are conducted to retrieve flowback effluent.

Other aspects and advantages of the claimed subject matter will be apparent from the following description and the appended claims.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

Typically, down is toward or at the bottom and up is toward or at the top of the figure. "Up" and "down" are oriented relative to a local vertical direction. However, in the oil and gas industry, one or more activities may take place in deviated or horizontal wells. Therefore, one or more figures may represent an activity in vertical, approximately vertical, deviated, approximately horizontal, or horizontal wellbore configuration.

DETAILED DESCRIPTION

Figure 1:
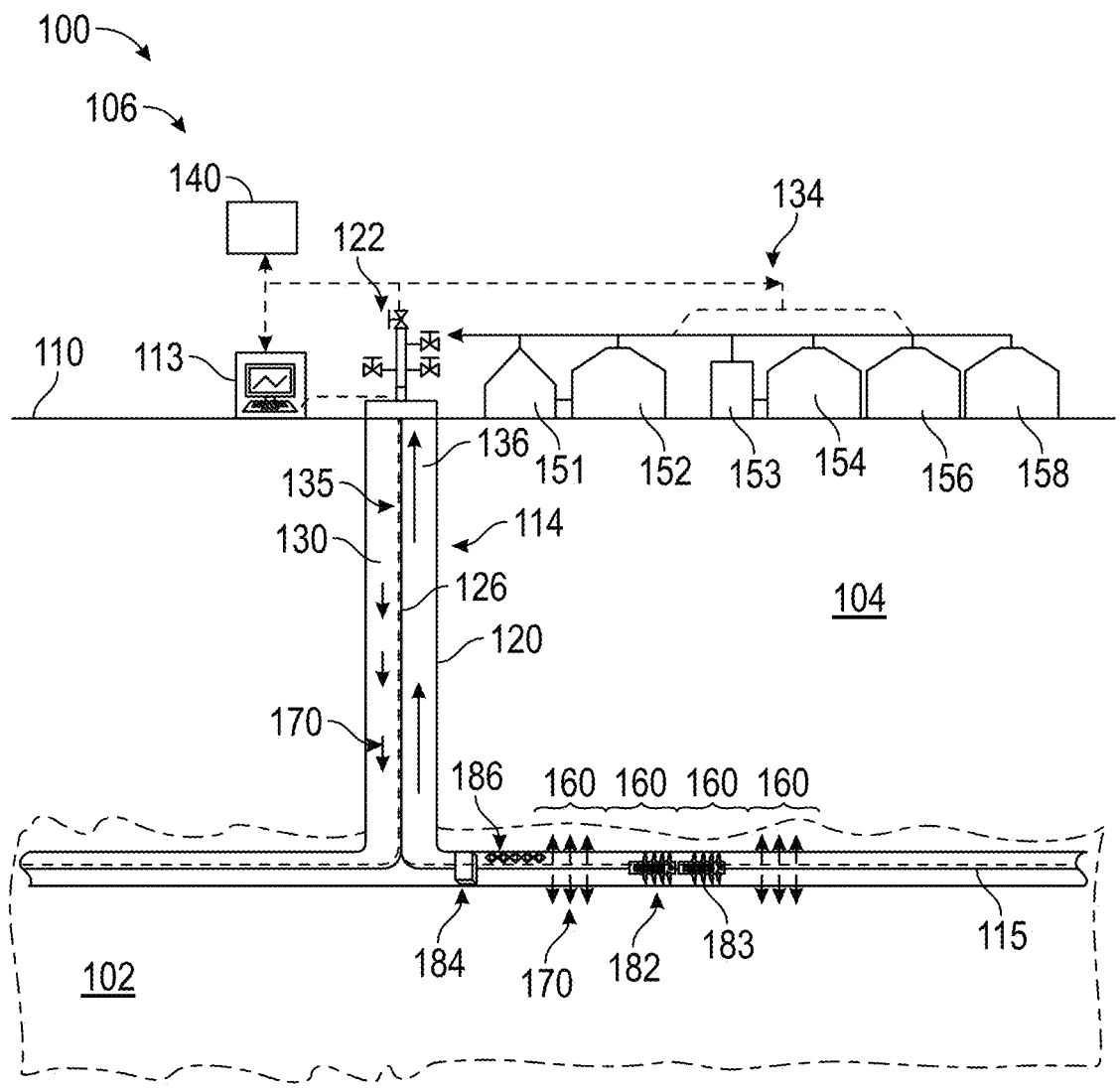
FIG. 1 is a diagram that illustrates a well environment with an enhanced $CO_2$ fracking operation system in accordance with one or more embodiments.

Fracking using carbon dioxide ($CO_2$) is useful for several reasons. Specifically, $CO_2$ has high miscibility in condensate, $CO_2$ often eliminates the need for $N_2$ lifting with coiled tubing and $CO_2$ reduces the flowback time; thus, resulting in reduced costs. However, fracking using $CO_2$ results in a large amount of $CO_2$ flowing back to the surface during the post-fracking clean-up operations.

An enhanced $CO_2$ fracking Operation (ECO) using lower amounts of carbon (low-carbon method) is presented. The method significantly reduces the amount of $CO_2$ during operations and produces a greater volume of hydrogen ($H_2$).

Aside from reducing the amount of $H_2O$ used in hydraulic fracturing treatments, the low-carbon method also enhances productivity, reduces the flowback period, and reduces costs associated with carbon reuse and storage. Further, $H_2O$ and acid volumes used for operations may be reduced significantly. Specifically, $H_2O$ may be reduced by 50 percent and acid may be reduced by 30 percent compared to amounts used in typical fracking operations. The typical post stimulation flowback period may be reduced by approximately one to three days per stage.

In the present low-carbon method, $CO_2$ injections are alternated with other injectants or concurrently injected with other injectants. An oilfield reservoir, or injection formation produces large quantities of hydrocarbons upon flooding with $CO_2$ combined with other injectants including air, oxygen ($O_2$), $H_2O$, or nitrogen ($N_2$). Injectants may be useful in trapping $CO_2$ within the wellbore formation for a longer period of time.

$H_2O$ or gas injection including air may be used to displace and force hydrocarbons to a production wellbore. $H_2O$ or air or injections are also useful for oxidation reactions that generate flue gas sweep and thermal drive. The oxidation reaction also increases $H_2$ production. Stimulation technologies such as acoustic waves and catalysts may further enhance the reactions that produce $H_2$.

Typically, $N_2$ and $O_2$ are major components of air. The $O_2$ may be injected as a component of air, or as a component of air that has been partially enriched with $O_2$ such that the enriched air has a greater $O_2$ content than that of air in the atmosphere. The $O_2$ may also be injected as a component of an $O_2$ containing gas. The term "combustion gas" refers to $O_2$ or an $O_2$-comprising gas mixture that may be air, $O_2$ enriched air, high purity $O_2$ or other gases containing $O_2$.

Steam or hot water may also be injected into an injection formation. Hot water injected into the injection formation may flow into the lower parts of an injection formation even when the permeability of the upper layers is higher than that of the lower layers. This improves the overall sweep of the injection formation. This characteristic of hot water injection may be contrasted with characteristics of steam injection. In steam injection, the steam tends to preferentially sweep the upper layers of the injection formation.

Hot water is desired in a liquid state to reach deep and thin injection formations therefore the water is not heated above the boiling point at downhole pressures. The downhole pressure of the specific injection formation may vary. The temperature of the hot water injected into the injection formation may be in a range from 10° C. to about 200° C. above the injection formation temperature, such as from a lower limit of about 10° C. 15° C., 20° C., 25° C., 30° C. 35° C., 40° C., 45° C., or 50° C. above the injection formation temperature, to an upper limit of about 155° C., 160° C., 165° C., 170° C., 175° C., 180° C., 185° C. 190° C., 195° C., or 200° C. above the injection formation temperature.

Hot water injected into an injection formation tends to flow further down into the lower parts of the injection formation where heavy oil may be located. Heavy oil is a type of oil that is different from conventional oil in that it is much more difficult to recover from a subsurface injection formation. Generally, heavy oil has a higher density, higher viscosity, and lower mobility when compared to conventional oil. The exact definition of heavy oil is not agreed upon by the experts; however, most definitions are based on viscosity, density, and American Petroleum Institute (API) gravity. Heavy oil is usually defined as oil that has a viscosity ranging from 100 to 10,000 mPa·s at reservoir temperature, density ranging from 943 to 1.000 kg/m3, and API gravity of less than 20° or less than 10° API. Density is used to characterize heavy oil only if viscosity measurements are not available. This improves the overall sweep of the reservoir or injection formation, and the mobility ratio due to reducing the oil phase viscosity and mobilize more oil.

Additional $CO_2$ with $N_2$ (an immiscible gas) may be injected into an injection formation. This method is referred to as gas flooding and may be either miscible or immiscible. In miscible gas flooding, the $CO_2$ mixes with the oil to reduce its viscosity and improve flow. In immiscible gas flooding, the $N_2$ does not mix with the oil. Instead, the $N_2$ creates energy and increases the pressure to drive the hydrocarbons into the wellbore and promote additional recovery.

Diversion techniques may be used to increase zone coverage. Diversion techniques may be classified as mechanical or chemical. Mechanical diversion of treating fluid may be accomplished by coiled tubing with an inflatable packer, or with conventional straddle packers or ball sealers. Chemical diversion may be achieved by placing a viscous fluid, foam or gels to lower the penetration of the injected substance. Gelled and foamed acids may also be used as a means of improving acid placement by combining stimulation and diversion in one step.

Well flowback operations may be conducted. During the flowback phase, a fluid is produced that flows up the wellbore and through the well. The fluid may be a mixture of hydrocarbons such as oil and natural gas. The mixture may also contain some injectants such as $CO_2$, $H_2O$, $N_2$, combustion gas, and $H_2$. A retrievable downhole membrane may be used to generate higher concentrations of $H_2$.

Enhanced $CO_2$ Fracturing Systems

The low-carbon method may be applied to various types of well completions including vertical cased and cemented wells, and open-hole multi-stage fracturing wells. The method may be used in the injector (for injectivity enhancement), producer (for productivity enhancement), deep, shallow, single and multi-lateral wells.

FIG. 1 is a diagram that illustrates a well environment with an enhanced $CO_2$ fracking operation system in accordance with one or more embodiments. In FIG. 1, the well environment 100 includes an injection formation 102 located among the subsurface formations 104. A well system 106 is shown traversing the subsurface formations 104 and is in fluid communication with injection formation 102 via an injection wellbore 114.

Subsurface formations 104 may include one or more rock formations that resides beneath the surface 110. The well environment 100 includes a surface 110, which represents the surface of the earth. The surface 110 may be located on the ground, above water, under water, or under ice. The well system 106 may be formed for the purposes of developing a hydrocarbon well, such as an oil well, a gas well, a gas condensate well, or combinations thereof. The well system 106 may have been formed for the purposes of fluidly accessing the injection formation 102. The subsurface formations 104 and the injection formation 102 may each have heterogeneity with varying characteristics, such as degree of density, permeability, porosity, pressure, temperature, and fluid saturations of the rock within each formation. The injection formation may contain hydrocarbons.

The injection wellbore 114 may include a bored hole that extends from the surface 110 into the subsurface formations 104 such that fluid communication is established with the injection formation 102. The injection wellbore 114 is a void that is defined by wellbore wall 120. According to one or more embodiments, the injection wellbore 114 may include one or more horizontal portions 115.

According to one or more embodiments, the well system 106 includes a wellhead 122 that supports, couples to, and provides surface access to an injection line 126. The injection line 126 may be comprised of drill pipe, coiled tubing, fixed tubing, or other forms of fluid conduit for conveying fluids between the surface 110 and the injection formation 102. The wellbore annulus 130 is the void of the injection wellbore 114 between the injection line 126 and the wellbore wall 120. The wellhead also supports, couples to, and provides surface access to a signal and power line 135 (dotted line). The signal and power line 135 provides signal communication between the downhole components associated with the well system 106, injection line 126, and the well monitoring system 113 utilizing a computer processor on the surface, and power to operate the downhole components. The wellbore annulus 130 is filled with a completion fluid 136 to maintain structural integrity of the injection wellbore 114 and to protect the lines and objects, thermally and chemically, in the injection wellbore 114.

A number of units on the surface are utilized to provide substances to inject into the well. In FIG. 1, several tanks are provided: a combustion gas storage tank 152, an $H_2O$ storage tank 154, a $CO_2$ storage tank 156 and a $N_2$ storage tank 158. Quantities of combustion gas, $H_2O$, $N_2$ are stored in the units and are introduced into the injection wellbore 114 from the appropriate unit. The substances injected into the well from the various units may be individually or collectively referred to as injected substances 170. The well system further comprises one or more fracturing zones 160. The fracturing zone 160 is a part of the injection formation 102 that is in fluid communication with the horizontal portion 115 of the wellbore annulus 130.

According to one or more embodiments, combustion gas from the combustion gas storage tank 152 may be directed into a compressor 151 via a dedicated flowline. The compressor is configured to create compressed combustion gas prior to introduction into the injection formation. The compressed combustion gas has a pressure that is raised to a value greater than atmospheric pressure. The system may further include an air purifier (not illustrated) for embodiments configured to provide higher purity $O_2$ to the injection wellbore.

According to one or more embodiments, a $CO_2$ storage tank 156 may be configured to hold gaseous, liquid, critical, or supercritical $CO_2$.

According to one or more embodiments, $H_2O$ from the $H_2O$ storage tank 154 may be directed into a $H_2O$ heater 153 via a dedicated flowline. The $H_2O$ heater 153 may be located at the surface 110. The $H_2O$ heater 153 is configured to increase the temperature of the $H_2O$.

According to one or more embodiments, the $H_2O$ may be converted to steam. Steam is a vapor into which $H_2O$ is converted when heated, forming a mist of minute $H_2O$ droplets. The steam may be generated at a surface location and then injected into the wellbore and thence into the injection formation. Surface facilities to heat the $H_2O$ and to generate steam may include boilers, solar steam generators, concentrated solar plants, molten salt exchangers, or other heat exchange media and other devices known in the art to convert water to steam at the required temperatures and pressures to be used for stimulation of the target formation.

According to one or more embodiments, an apparatus generating steam may be located downhole within the wellbore. The downhole apparatus may use combustion, laser, or other forms of energy to increase the temperature of an $H_2O$ stream prior to injection of the in situ generated steam into one or more target zones in the injection formation. When injected from a surface steam generation system, steam quality available for injection may decrease with increasing wellbore length. Accordingly, some embodiments increase energy efficiency of a well stimulation process by disposing one or more steam generating apparatuses near one or more target zones. For example, a steam generating apparatus may be a device that is lowered in a wellbore, e.g., using a cable conveyance system, that subsequently produces steam. From a continuous $H_2O$ supply, the steam generating apparatus may provide continuous steam to the injection formation in the wellbore to increase fluid flow and production.

The well system 106 may include a well monitoring system 113. According to one or more embodiments, the well monitoring system 113 is configured to obtain information that allows monitoring of various operations of the well system 106, including the reactivity and the mineralization process. The well monitoring system 113 may relay information for viewing by an external viewer. The information may be numerically displayed, graphically displayed, or both. An external viewer may include a computer monitor, a television, a printer, or any other form of temporal or permanent version of record keeping, communicating, and displaying that may be visually and audibly appreciated. The data obtained from the monitoring system may be inputted into a well control system 140.

The monitoring system may be conducted manually or by automated sensors. According to one or more embodiments, samples are collected, and various tests are conducted manually to obtain information to assess the reaction and productivity of the reactions. In one or more embodiments, the monitoring may include collecting samples of the injection fluid and conducting tests to obtain properties such as the amount of carbonate mineral, divalent cations and carbonate anions in the injection fluid, and the pH of the injection fluids. In other embodiments, the monitoring may include measuring the amount of injection fluid introduced to the wellbore and the amount returning to assess the level of $H_2$ generation.

In other embodiments, the monitoring includes incorporating downhole sensors into the wellbore and obtaining properties such as the amount of carbonate anions in the fluid such as injection fluid and carbonated mixture, and the pH of the injection fluid. In some embodiments, the monitoring may include observing the reactions or mineralization in the injection formation by using sensors such as thermal and ultrasonic sensors. The monitoring may be continuous or intermittent. According to one or more embodiments, the monitored data may be used to control or modify the various parts of the process. For example, the monitored data may be used to modify injection times, injection volumes, or to repeat certain steps to ensure a desired result.

According to one or more embodiments, a well control system 140 may use manual or pre-determined instructions and algorithms retained in a memory of a computer system to conduct operations of the units on the surface within the well system 106. For example, the quantity of $H_2O$, $CO_2$, $N_2$ and combustion gas introduced into the wellbore and determining the progress of the reactions in the injection formation may all be provided by the well monitoring system 113 and handled by the well control system 140. As illustrated in FIG. 1, command signals for operations of portions of the well system 106, such as the sequence and quantity of injections from the units on the surface to the injection wellbore 114 may be transmitted from well control system 140 via a signal and power lines 134 (dotted line). Signal and power lines 134 may interlink the well control system 140 with control flow valves of the combustion gas storage tank 152, $H_2O$ storage tank 154, and $CO_2$ storage tank 156.

According to one or more embodiments, a well system 106 may include an acoustic unit 182. An acoustic unit 182 is configured to transmit acoustic waves into the injection formation 102. In FIG. 1, the acoustic unit 182 is shown transmitting acoustic waves 183 into the injection formation 102. The acoustic waves 183 transmitted into the injection formation 102 are configured to accelerate or stimulate various chemical reactions when influenced by acoustic energy.

The acoustic waves traversing the injection formation stimulates motion in not only the injection formation material but also in the fluids, such as the aqueous solution and the CO2, and the hydrocarbons. The energy conveyed into the injection formation helps to accelerate various reactions. Variables, such as the formation material, porosity, thickness of injection formation, the concentration of CO2, H2O or NH4 introduced, may affect the frequency used to stimulate the various reactions in the injection formation. The frequency, power, and the periods of transmission may be controlled utilizing a coupled control signal line or by other means as known in the art with communicating with the device.

The audio frequency that is utilized in stimulating the reaction in the injection formation may vary. In one or more embodiments, the frequency of transmission from the acoustic unit may be in an ultrasonic frequency range (ultrasonic). Ultrasonic frequency is appreciated to be in a range of from about 20 kHz (kilohertz) to several gigahertz. In one or more embodiments, the frequency of transmission from the acoustic unit may be in the sonic frequency range (sonic). The sonic frequency range, also known as the audible frequency range, is appreciated to be in a range of from about 20 Hz (Hertz) to about 20 kHz. In one or more embodiments, the frequency of transmission from the acoustic unit may be in the infrasonic frequency range (infrasonic). Infrasonic frequencies are appreciated to be in a range of from about 0.001 Hz to about 20 Hz.

According to one or more embodiments, the acoustic unit may include a microwave emitter. Microwaves may be useful in heating various chemicals and hydrocarbons thus accelerating or stimulating various chemical reactions. Microwaves frequency is appreciated to be in a range of from about 300 MHz (megahertz) to 300 GHz (gigahertz).

According to one or more embodiments, a well system 106 may include a catalyst 186. A catalyst 186 is useful for accelerating or stimulating various chemical reactions. For example, a catalyst may accelerate the water gas shift reaction where reactants carbon monoxide and H2O accelerate the production of H2 and CO2 (see equation 2 below). According to one or more embodiments, iron oxide particles may be introduced into the injection formation to stimulate the water gas shift reaction. According to one or more embodiments, a catalyst may be co-injected with steam.

According to one or more embodiments, a well system 106 may include an H2 separation membrane 184 (also known as "membrane"). The membrane 184 may be configured to separate H2 from CO2, other gases, and light hydrocarbons and to pass the H2 to a H2 storage container (not illustrated). The membrane 184 may be a H2 permeation membrane configured to extract highly pure H2 from gas or liquid mixtures. In some embodiments, the membrane 184 may be a ceramic membrane. According to one or more embodiments, a membrane 184 may be a proton conducting ceramic membrane. Ceramic membranes may be fabricated using inorganic materials such as alumina, silica, or zirconia. Ceramic membranes are thermally stable and may operate under high temperatures and pressures.

According to one or more embodiments, the injection well and the production well utilize the same wellbore. The wellbore annulus 130 is configured to receive the fracking fluid (also known as "flowback fluid") after fracking operations. Well flowback (or flowback) operations are necessary for well cleanup, to remove fluids that were introduced to the well during hydraulic fracturing and any debris that accumulated in the wellbore. Flowback operations also assess the well's potential production. The flowback fluid produced during this flowback operations is a multiphase flow comprising a mixture of water, volatile hydrocarbons and hydraulic fracking fluids introduced by the well operations. The flowback fluid also contains H2 produced by the various reactions shown below. The flowback fluid flows uphole (arrows) through the wellbore annulus 130 to the surface 110. According to one or more embodiments, the injection well and the production are separate and utilize different wellbores. The flowback fluid may be directed from the wellhead 122 and into a treatment and separation facility. The H2 in the flowback fluid is separated from other substances in the flowback fluid and may be stored in a storage container. According to one or more embodiments, the stored H2 is compressed to a range from about 600 psig (pounds per square inch gauge) to 800 psig.

Methods of Treating an Injection Formation

Figure 2:
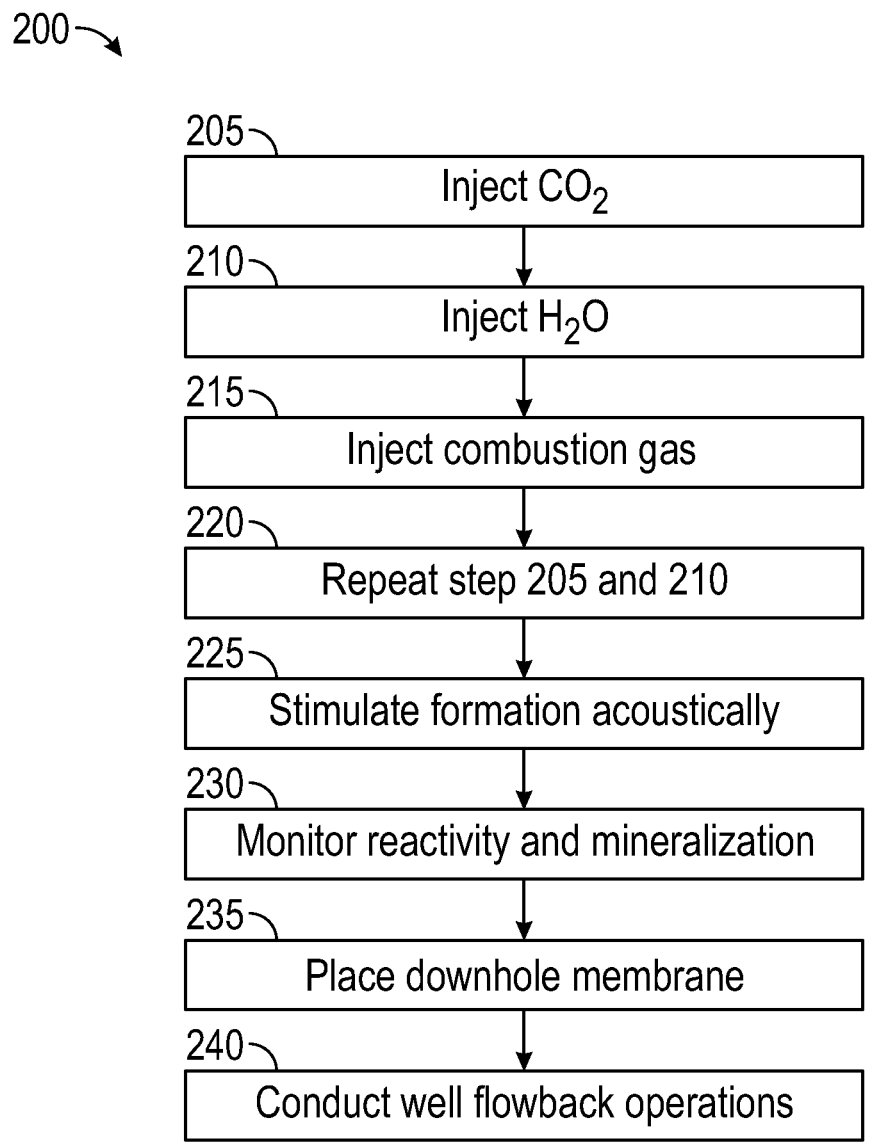
FIG. 2 is a flowchart that illustrates steps of a method of treating an injection formation in accordance with one or more embodiments.

FIG. 2 is a flowchart that illustrates a method of treating an injection formation in accordance with one or more embodiments. The injection formation may be configured as a single lateral well, a multi-lateral well, or a multi-level well.

According to one or more embodiments, in a method of treating an injection formation, CO2 is introduced into an injection wellbore. In method 200 of FIG. 2, step 205 shows that CO2 fluid is introduced into an injection wellbore. Non-hydrocarbon gases, such as CO2 are useful for displacing fluid in the injection formation. Likewise, gas may also be injected directly into an injection formation, e.g., into the gas cap, to compensate for the reservoir's pressure decline. In one or more embodiments, the CO2 is introduced in a liquid state. In one or more embodiments, the CO2 is introduced as a critical fluid. In one or more embodiments, the CO2 is introduced as a supercritical fluid. In one or more embodiments, CO2 in liquid or gas form may convert into near critical, critical, or supercritical fluid under downhole conditions. According to one or more embodiments, combustion gas may be added to CO2 to form a CO2-combustion gas mixture. According to one or more embodiments, combustion gas in the CO2 mixture is present in a concentration in a range of from about 0.0001 vol % (volume percent) to 5 vol % of the CO2-combustion gas mixture.

The CO2 may be introduced into the injection wellbore at a pressure that is greater than atmospheric pressure but less than the critical pressure of CO2. The critical pressure value of CO2 is about 72.8 atm (atmospheres). According to one or more embodiments, the CO2 is introduced into the injection wellbore 114 at a pressure that is at or greater than the critical pressure of CO2. At typical wellbore conditions, CO2 introduced at or greater than the critical pressure will likely transition into a supercritical state because the critical point temperature of CO2 is 31.0 Celsius (° C.). At the critical point or in the supercritical state, the properties of CO2 change, especially its polarity, which helps increase the amount of CO2 that may dissolve into the H2O of the injected substance 170.

According to one or more embodiments, in a method of treating an injection formation, H2O is introduced into an injection wellbore. In method 200 of FIG. 2, step 210 shows that H2O is introduced into an injection wellbore. H2O fluid may be distilled water, brine, deionized water, tap water, fresh water from surface or subsurface sources, formation water produced from the structural low, formation water produced from a different geologic formation, production water, frac or flowback water, natural and synthetic brines, residual brine from desalination processing, a regional water source, such as fresh water, brackish water, natural and synthetic sea water, potable water, non-potable water, ground water, seawater, other waters, and combinations thereof, that are suitable for use in a wellbore environment. In one or more embodiments, the water used may naturally contain contaminants, such as salts, ions, minerals, organics, and combinations thereof.

According to one or more embodiments, the H2O and CO2 fluid are introduced into the injection wellbore through a single line. In one or more embodiments, the H2O and the CO2 fluid are introduced into the injection wellbore though separate lines. The H2O and CO2 may be injected sequentially or concurrently. According to one or more embodiments H2O and the CO2 fluid are mixed and injected as a mixture. Further, the CO2 fluid and H2O may be injected repeatedly to reach a desired H2 production level. For example, CO2 fluid and H2O may be injected in multiple cycles before combustion gas is injected.

According to one or more embodiments, in a method of treating an injection formation, combustion gas is introduced into an injection formation. In method 200 of FIG. 2, step 215 shows that combustion gas is introduced into an injection formation. The combustion gas may be pressurized depending on the type of formation. According to one or more embodiments, high pressure combustion gas injection (HPAI) is injected into an injection formation. The pressurized combustion gas in HPAI contains 02 that reacts with some of the hydrocarbons in the injection formation to produce CO2. HPAI may be useful to increase production for light oils instead of using light combustion gas injection (LAI). The combustion gas may be gaseous and factors such as the gas flow rate, time of flowing gas, and amount of gas needed may depend on the environmental variables such as temperature and pressure, and fluid properties of the injection formation. According to one or more embodiments, heated combustion gas (hot combustion gas) is introduced into the injection formation. The hot combustion gas may be useful for partial combustion of light hydrocarbons to produce carbon monoxide (CO) and H2. According to one or more embodiments, the hot combustion gas is at a temperature in a range from about 150° C. to 200° C.

There are mainly two reactions that produce H2 in the presence of hydrocarbons when combustion gas is injected. Namely, the partial oxidation reaction and the water gas shift reaction. The elevated temperature of the injection formation, that is, temperature greater than surface, is useful to carry out several reactions described herein. In the partial oxidation reaction, hydrocarbon ($C_nH_m$) reacts with O2 in the combustion gas and produces H2, CO and energy in the form of heat as shown in Equation 1 (Eq.1). The complete combustion of crude oil may generate heat in the range of around 42-47 megajoules per kilogram (MJ/Kg). In the water gas shift reaction, the CO produced in the partial oxidation of hydrocarbons or found in the injection formation reacts with H2O to produce H2, CO2, and heat energy as shown in Equation 2.

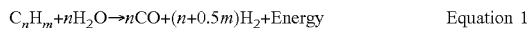

$$C_nH_m + nH_2O \rightarrow nCO + (n+0.5m)H_2 + Energy \qquad \text{Equation 1}$$

$$CO + H_2O \rightarrow CO_2 + H_2 + Energy \qquad \text{Equation 2}$$

In some injection formations, such as gas reservoirs, a major reactant in the partial oxidation reaction is methane (CH4). In this partial oxidation reaction, CH4 reacts with O2 to produce H2, CO, and heat energy as shown in Equation 3. However, in a full oxidation reaction, CH4 reacts with O2 to produce H2, CO2 and heat energy as shown in Equation 4. The heat energy produced by the reaction shown in Equation 4 is greater than the energy produced by the reaction shown in Equation 3.

$$CH_4 + \tfrac{1}{2}O_2 \rightarrow CO + 2H_2 + Energy \qquad \text{Equation 3}$$

$$CH_4 + H_2O \leftrightarrow CO + 3H_2 + Energy \qquad \text{Equation 4}$$

According to one or more embodiments, in a method of treating an injection formation, injecting CO2 and injecting H2O into an injection formation is repeated. In method 200 of FIG. 2, step 220 shows that step 205 of introducing CO2 into an injection wellbore and step 210 of injecting H2O into an injection wellbore is repeated after combustion gas is introduced into an injection wellbore. The steps of H2O injection and CO2 injection may be repeated several times. Repeating H2O and CO2 injections may be useful to maintain the pressure in the injection formation. According to one or more embodiments, the number of times that H2O and CO2 injections are repeated may depend on data produced by monitoring the process.

In some embodiments, the formation treatment composition may optionally include additional additives, such as a foamer. Examples of foamers include, but are not limited to, surfactants, for example, water-soluble, nonionic, anionic, cationic, and amphoteric surfactants; carbohydrates, for example, polysaccharides, cellulosic derivatives, guar, guar derivatives, xanthan, carrageenan, starch polymers, gums, polyacrylamides, polyacrylates, betaine-based surfactants, viscoelastic surfactants, natural and synthetic clays; polymeric surfactants, for example, partially hydrolyzed polyvinyl acetate; partially hydrolyzed modified polyvinyl acetate; block or copolymers of polyethane, polypropane, polybutane and polypentane; proteins; partially hydrolyzed polyvinyl acetate, polyacrylate, and derivatives of polyacrylates; polyvinyl pyrrolidone and derivatives thereof.

According to one or more methods of treating an injection formation, the injection formation is stimulated acoustically. In method 200 of FIG. 2, step 225 shows that the injection formation is stimulated acoustically. In one or more embodiments, the acoustic signal may be selected from an ultrasonic, a sonic, or an infrasonic frequency. In one or more embodiments, the transmission may be selected from continuous, periodic, or random pattern. In one or more embodiments, the transmission may be utilized to produce dissidence within the formation. In one or more embodiments, the transmission may be utilized to provide a harmonic within the formation.

The partial oxidation of hydrocarbons located in the injection formation and the O2 in the injected combustion gas may be accelerated or stimulated by acoustic energy transmitted into the injection formation to produce H2. Variables, such as the formation material, porosity, thickness of injection formation, the concentration of CO2, or O2, may affect the frequency utilized to stimulate the reaction in the injection formation In a method of treating an injection formation, in one or more embodiments the injection formation is monitored. In method 200 of FIG. 2, step 230 shows that the injection formation is monitored. For example, temperature sensors and pressure sensors may be used to measure temperature and pressure respectively. The injection formation and the progress of the reactions may be monitored as previously described, such as by initiating flowback into the treatment zone and detecting pH or CO2 concentration levels in the fluid. The wellbore wall in fluid contact with the injection formation may also be inspected utilizing known techniques for signs of corrosive damage, such as by acidification, or mineralization in the injection formation. Also, chemical, radioactive, or physical (nanoparticle) tracers may be utilized to monitor the chemical reactions. Monitoring of the well may be conducted at any step of method 200 and is not limited to occur before or after any particular step of method 200.

In a method of treating an injection formation, in one or more embodiments a membrane is placed in the wellbore annulus. In method 200 of FIG. 2, step 235 shows that a membrane is placed downhole in the injection formation. The membrane is useful for separating H2 from CO2 other gases and light hydrocarbons. The H2 that passes through the membrane passes towards the surface where the H2 may be captured. According to one or more embodiments, the membrane is removed from the wellbore annulus after subsequent flowback operations.

In a method of treating an injection formation, in one or more embodiments well flowback operations are conducted. In method 200 of FIG. 2, step 240 shows that well flowback operations are conducted. The flowback fluid is monitored and the monitoring may be performed via one or more manual or automated sensors within the wellbore. The sensors may monitor acidity, composition, temperature, rate, or other aspects of the flow back effluent. According to one or more embodiments, monitoring of the flowback may be performed or measured at a surface location based upon produced fluids received at the surface.

Figure 3:
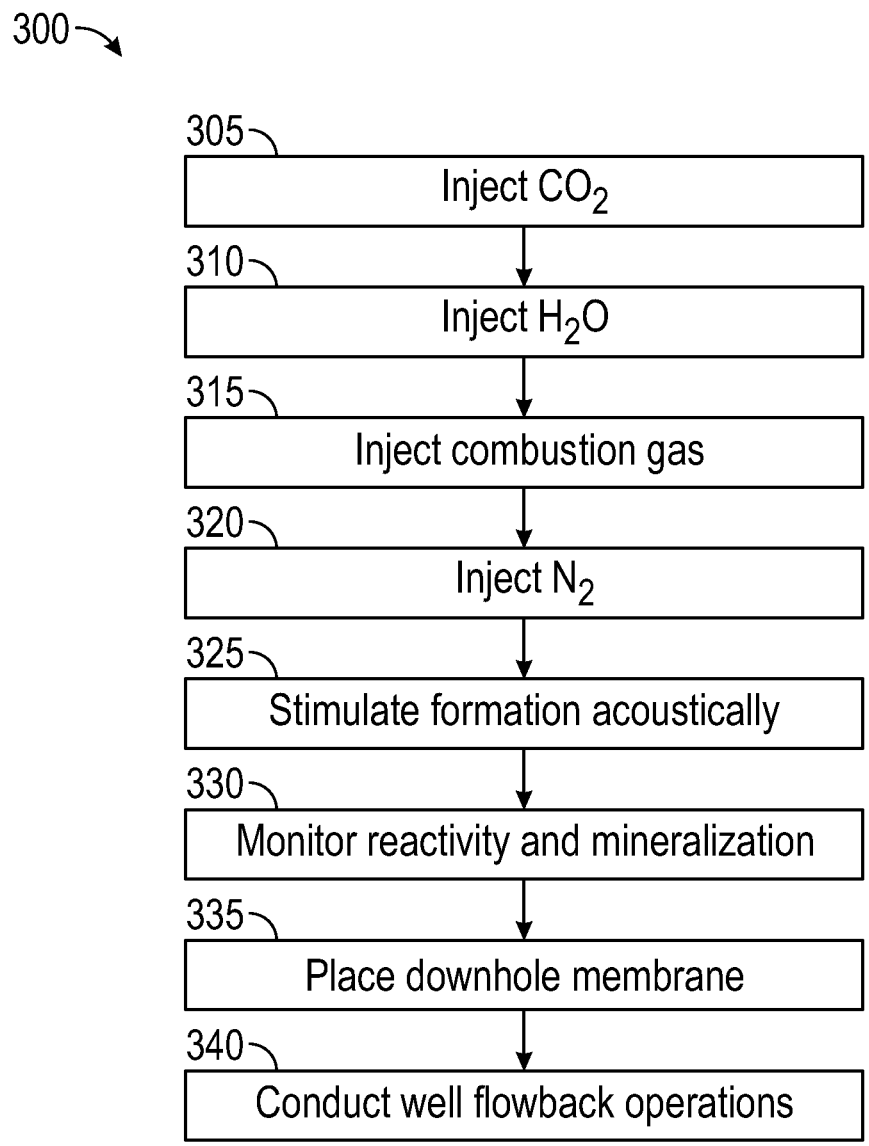
FIG. 3 is a flowchart that illustrates steps of a method of treating an injection formation in accordance with one or more embodiments.

FIG. 3 is a flowchart that illustrates a method of treating an injection formation in accordance with one or more embodiments. Method 300 of FIG. 3 includes many of the same elements as method 200 of FIG. 2; therefore, some of those similar aspects are not repeated in detail for the sake of brevity. In method 300 of FIG. 3, step 305 shows that CO2 fluid is introduced into an injection wellbore, step 310 shows that H2O is introduced into an injection wellbore, and step 315 shows that combustion gas is introduced into an injection formation.

According to one or more embodiments, in a method of treating an injection formation, N2 is introduced into an injection wellbore. In method 300 of FIG. 3, step 320 shows that N2 is introduced into an injection wellbore. N2 is useful for displacing fluid in the injection formation.

In method 300 of FIG. 3, step 325 shows that the injection formation is simulated stimulated acoustically, step 330 shows that shows that the injection formation is monitored, step 335 shows that a membrane is placed downhole in the injection formation, and step 340 shows that well flowback operations are conducted.

Figure 4:
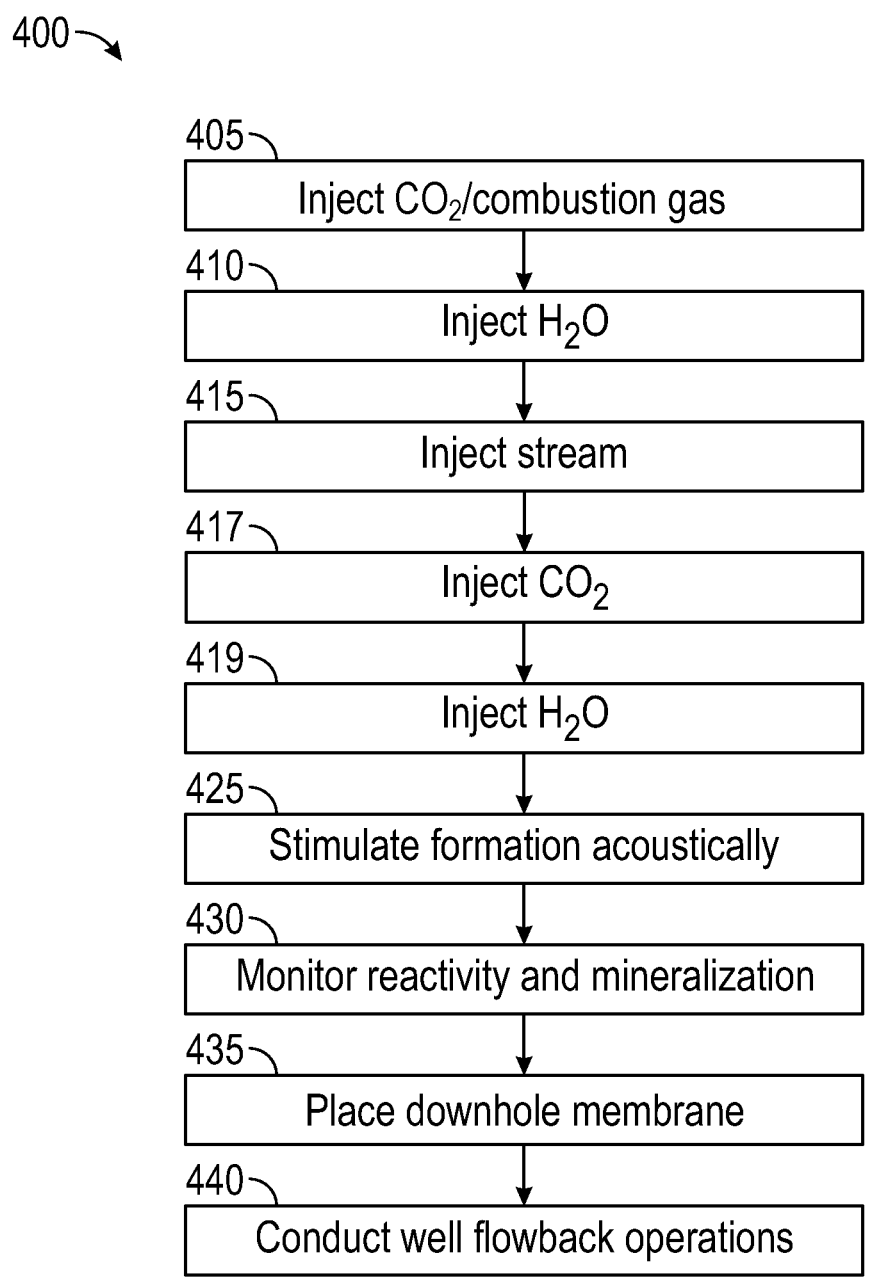
FIG. 4 is a flowchart that illustrates steps of a method of treating an injection formation in accordance with one or more embodiments.

FIG. 4 is a flowchart that illustrates a method of treating an injection formation in accordance with one or more embodiments. The injection formation may be configured as a single lateral well, a multi-lateral well, or a multi-level well. Method 400 of FIG. 4 includes many of the same elements as method 200 of FIG. 2 and method 300 of FIG. 3; therefore, some of those similar aspects are not repeated in detail for the sake of brevity.

According to one or more embodiments, in a method of treating an injection formation, CO2 and combustion gas is introduced into an injection formation. In method 400 of FIG. 4, step 405 shows that CO2 and combustion gas are introduced into an injection wellbore. According to one or more embodiments, the CO2 or combustion gas may be injected concurrently. According to one or more embodiments, the CO2 or combustion gas may be injected sequentially in any possible sequence of injection. According to one or more embodiments, in a concurrently injected CO2 and combustion gas mixture, the injected combustion gas may be in a range from about 50% to 90% combustion gas by volume.

In one or more embodiments, the CO2 introduced into the injection formation may be in a gas, liquid, a critical fluid or a supercritical fluid. As mentioned above, the combustion gas may be pressurized depending on the type of formation and may be gaseous. The gas flow rate, time of flowing gas, and amount of gas needed may depend on the environment variables such as temperature and pressure, fluid properties of the injection formation.

In one or more embodiments, the O2 in the combustion gas is purified. The O2 may be injected as a component of combustion gas, or as a component of air that has been partially enriched with O2 such that the enriched air has a greater O2 content than that of the atmosphere. The O2 content may be greater than about 20 vol. % (volume percent) O2 to greater than 99.9 vol. % O2. According to one or more embodiments, O2-comprising compounds may be used. According to one or more embodiments, the combustion gas may be pressurized, and the pressure of the combustion gas may be greater than 100 psi (pounds per square inch). According to one or more embodiments, the pressure of the combustion gas is in a range of from about 500 psi to about 1000 psi. Utilizing O2 at elevated concentrations and pressures may require special O2-handling facilities and materials, including piping and isolation systems, which are appreciated by one of skill in the art.

Heat from the injection formation may be utilized to pre-heat the combustion gas introduced into the injection formation. In instances where the injection and production wells are the same, injection tubing and production tubing may be in the same well. This may be useful in some instances as the hot production gas may pre-heat the combustion gas as it descends into the depleted formation. In instances where the wellbores are different, a heat exchanger on the surface, such as in the gas turbine, may be utilized to preheat the combustion gas before introduction.

In method 400 of FIG. 4, step 410 shows that H2O is introduced into an injection wellbore.

According to one or more embodiments, in a method of treating an injection formation, steam is introduced into an injection formation. In method 400 of FIG. 4, step 415 shows that steam is introduced into an injection formation. Steam is useful for enhancing the productivity, injectivity, or sweep efficiency of a target zone of the wellbore. According to one or more embodiments, combustion gas may be added to steam to form a steam-combustion gas mixture. According to one or more embodiments, combustion gas in the steam-combustion gas mixture is present in a concentration in a range of from about 0.0001 vol % to 5 vol % of the steam-combustion gas mixture.

According to one or more embodiments, in a method of treating an injection formation, injecting CO2 and injecting H2O into an injection formation is repeated. In method 400 of FIG. 4, step 417 and step 419 show that additional CO2 and H2O is introduced into an injection wellbore after steam is introduced into an injection wellbore.

Step 425 shows that the injection formation is stimulated acoustically. Step 430 shows that shows that the injection formation is monitored, step 435 shows that a membrane is placed downhole in the injection formation, and step 440 shows that well flowback operations are conducted.

Figure 5:
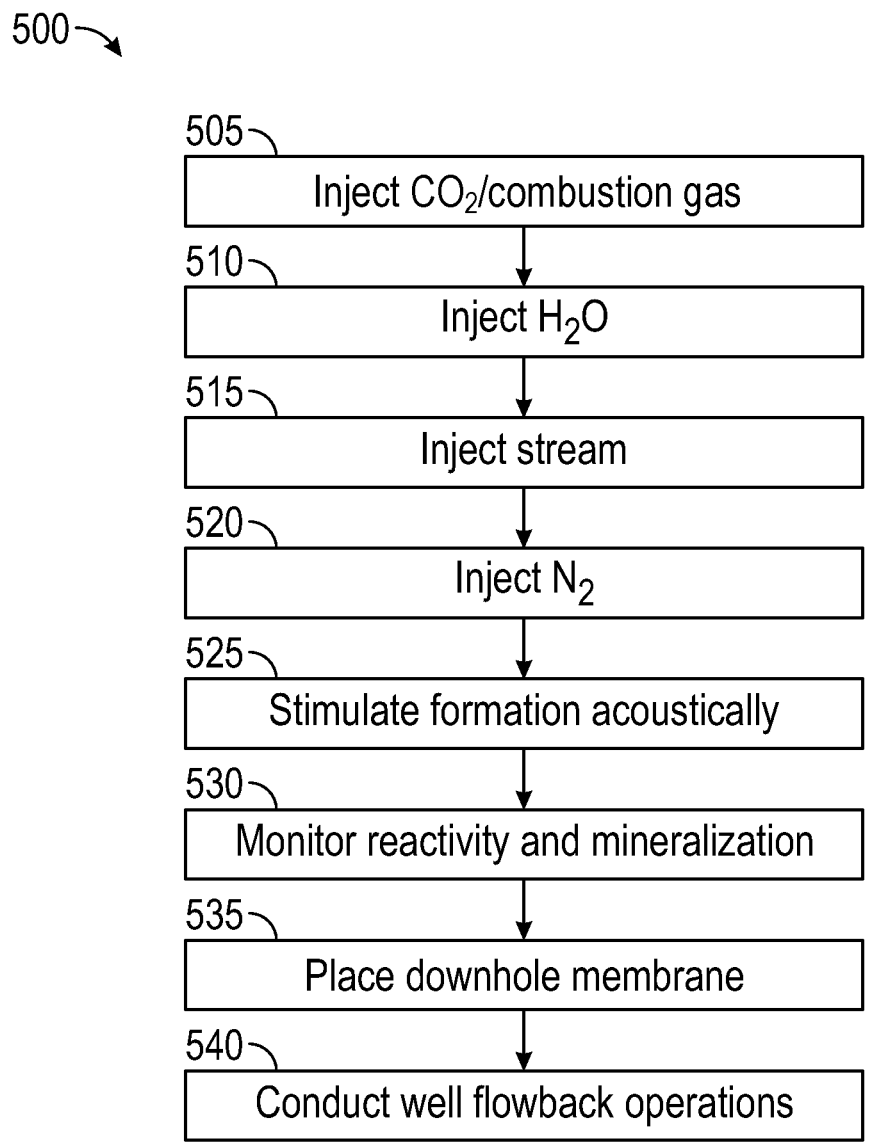
FIG. 5 is a flowchart that illustrates steps of a method of treating an injection formation in accordance with one or more embodiments.

FIG. 5 is a flowchart that illustrates a method of treating an injection formation in accordance with one or more embodiments. Method 500 of FIG. 5 includes many of the same elements as method 400 of FIG. 4; therefore, some of those similar aspects are not repeated in detail for the sake of brevity.

In method 500 of FIG. 5, step 505 shows that CO2 and combustion gas are introduced into an injection wellbore, step 510 shows that H2O is introduced into an injection wellbore, and step 515 shows that combustion gas is introduced into an injection formation.

According to one or more embodiments, in a method of treating an injection formation, N2 is introduced into an injection wellbore. In method 500 of FIG. 5, step 520 shows that N2 is introduced into an injection wellbore. In method 500 of FIG. 5, step 525 shows that the injection formation is simulated acoustically, step 530 shows that shows that the injection formation is monitored, step 535 shows that a membrane is placed downhole in the injection formation, and step 540 shows that well flowback operations are conducted.

As described above, in the low-carbon method, CO2 injections into an injection formation are alternated with other injectants including combustion gas, H2O, or N2. The injectants are not only useful for hydrocarbon production; but also, for trapping CO2, and for stimulating oxidation reactions that increase H2 production. Further, stimulation technologies such as acoustic waves and catalysts may be used to enhance the reactions that produce H2. Also, various membranes may be placed in a wellbore to purify the H2 from CO2 and other injectants.

Hot water and steam may also be injected into an injection formation to improve the overall sweep of the upper and lower layers. Additionally, CO2 with N2 may be injected into an injection formation for miscible or immiscible gas flooding to promote additional hydrocarbon recovery.

As described above, the enhanced CO2 fracking operation significantly reduces the amount of CO2, H2O and acids used while simultaneously increasing the production of H2 and hydrocarbons. Further, the enhanced CO2 fracking operation also reduces the flowback period as well as the costs associated with storing CO2 and other injectants.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for stimulating hydrogen production from an injection formation, the method comprising:
   providing a well traversing a subsurface into an injection formation containing hydrocarbons;
   introducing carbon dioxide into the injection formation via the well;
   introducing water into the injection formation via the well;
   introducing combustion gas into the injection formation via the well;
   stimulating the injection formation using one or more of infrasonic, sonic, and ultrasonic stimulation;
   monitoring the injection formation via one or more sensors located in the injection formation to determine one or more properties of reactions in the injection formation and a flow back effluent;
   placing a membrane configured to produce hydrogen in the well; and
   conducting well flowback operations.

2. The method of claim 1, wherein carbon dioxide and water are injected sequentially.

3. The method of claim 1, wherein carbon dioxide and water are injected concurrently.

4. The method of claim 1, wherein the combustion gas is introduced into the injection formation after introducing the water and the carbon dioxide and additional carbon dioxide and water are introduced into the injection formation after introducing combustion gas into the injection formation via the well.

5. The method of claim 1, wherein nitrogen is introduced into the injection formation after introducing combustion gas into the injection formation via the well.

6. The method of claim 1, wherein a catalyst is introduced into the injection formation.

7. The method of claim 1, wherein the membrane is removed from the injection formation after flowback.

8. A method for stimulating hydrogen production from an injection formation, the method comprising:
   providing a well traversing a subsurface into the injection formation containing hydrocarbons;
   introducing carbon dioxide and combustion gas and into the injection formation via the well;
   introducing water into the injection formation via the well;
   introducing steam into the injection formation via the well;
   stimulating the injection formation using one or more of infrasonic, sonic, and ultrasonic stimulation;
   monitoring the injection formation via one or more sensors located in the injection formation to determine one or more properties of reactions in the injection formation and the flow back effluent;
   placing a membrane configured to produce hydrogen in the well; and
   conducting well flowback operations.

9. The method of claim 8, wherein introducing carbon dioxide and combustion gas into the injection formation comprises sequentially injecting carbon dioxide into the injection formation via the well, then injecting combustion gas into the injection formation via the well.

10. The method of claim 8, wherein carbon dioxide and combustion gas are injected concurrently into the injection formation via the well.

11. The method of claim 8, wherein the steam is introduced into the injection formation after introducing the water and the carbon dioxide and additional carbon dioxide and water are introduced into the injection formation after introducing steam into the injection formation via the well.

12. The method of claim 8, wherein nitrogen is introduced into the injection formation after introducing steam into the injection formation via the well.

13. The method of claim 8, wherein a catalyst is introduced into the injection formation.

14. The method of claim 8, wherein the membrane is removed from the injection formation after flowback.

* * * * *